United States Patent [19]

Rimlinger, Jr.

[11] Patent Number: 5,168,632
[45] Date of Patent: Dec. 8, 1992

[54] AUTOMOTIVE WHEEL ALIGNMENT METHOD AND APPARATUS

[76] Inventor: Charles H. Rimlinger, Jr., 703 Vineland Ct., Brentwood, Tenn. 37027

[21] Appl. No.: 879,509

[22] Filed: May 4, 1992

Related U.S. Application Data

[63] Continuation of Ser. No. 522,554, May 14, 1990, abandoned.

[51] Int. Cl.$^5$ ............................................. G01B 5/255
[52] U.S. Cl. ........................................ 33/288; 33/337; 33/203.18
[58] Field of Search ............. 33/203.18, 203.19, 203.2, 33/288, 336, 337; 356/154, 155

[56] References Cited

U.S. PATENT DOCUMENTS

| | | | |
|---|---|---|---|
| 2,729,896 | 1/1956 | Rosenblum | 33/347 |
| 3,029,515 | 4/1962 | Marteil | 33/288 |
| 3,071,863 | 1/1963 | MacMillan | 33/336 |
| 3,091,862 | 6/1963 | MacMillan | 33/288 |
| 3,135,052 | 6/1964 | MacMillan | 33/288 |
| 3,337,961 | 8/1967 | Holub | 33/288 |
| 3,951,551 | 4/1976 | Macpherson | 356/155 |
| 3,956,830 | 5/1976 | MacMillan | 33/203.18 |
| 4,303,338 | 12/1981 | Morrison et al. | 356/155 |
| 4,541,162 | 9/1985 | Halvin | 33/203.18 |
| 4,569,140 | 2/1986 | Hobson | 33/203.18 |
| 4,803,785 | 2/1989 | Reilly | 33/203.18 |
| 4,918,821 | 4/1990 | Bjork | 33/203.18 |

*Primary Examiner*—Thomas B. Will
*Attorney, Agent, or Firm*—Heiskell, Donelson, Bearman, Adams, Williams & Kirsch

[57] ABSTRACT

An automobile wheel alignment method and apparatus are provided for duplicating the pre-determined readings for the parameters of camber, caster, and toe, and allowing for the precise adjustment of such parameters at a location remote from the conventional alignment machine. First, second, and third indicators are provided, along with a gauge element, for duplicating the readings for camber, caster, and toe. Also provided are a housing for containing the indicators, and mounting means for removably securing the housing to a hub assembly after the wheel has been removed.

11 Claims, 6 Drawing Sheets

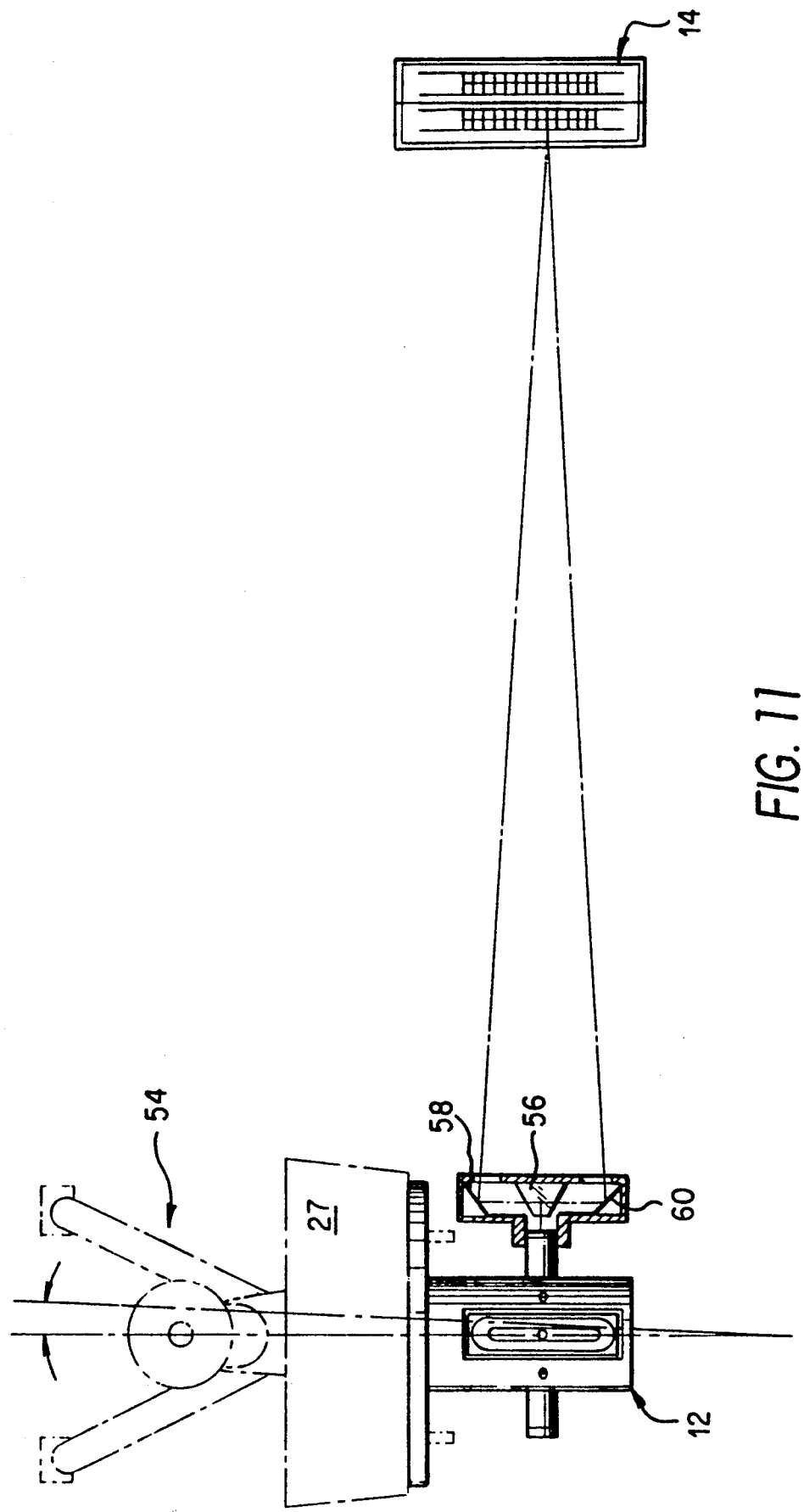

AUTOMOTIVE WHEEL ALIGNMENT METHOD AND APPARATUS

This is a continuation copending application Ser. No. 07/522,554 filed on May 4, 1990, now abandoned.

BACKGROUND OF THE INVENTION

1. Field

This invention relates to a method and apparatus for use in aligning the wheels of an automobile and, in particular, a method and apparatus for indicating the orientation of an automobile wheel relative to the manufacturer's specifications for proper alignment throughout the alignment process.

2. Brief Description of the Prior Art

Due to the proliferation in recent years of front wheel drive cars, a problem has arisen regarding the proper alignment of the rear wheels of such cars. In order to provide background information s that the unique features of this invention may be completely understood and fully appreciated, the steps for performing a four-wheel alignment on a typical front wheel drive vehicle requiring such alignment should be described.

Initially, the existing readings for the camber, caster, and toe parameters for all four wheels are obtained with a conventional alignment machine. As is generally known in the art, camber refers to the outward or inward tilt of the wheel at the top, caster refers to the angle, in degrees, of the steering axis relative to a standard vertical axis, and toe represents the extent to which a leading edge of the wheel is biased inwardly (toe-in) or outwardly (toe-out) expressed in degrees, inches, or millimeters. Generally speaking, wheel alignment involves comparing these initial readings to the specifications established by the vehicle's manufacturer, then applying appropriate adjustment techniques until the actual readings correspond to the recommended specifications.

Of the front wheel drive cars requiring four-wheel alignment, approximately half require some form of modification or adaptation during the alignment procedure because these cars are manufactured with no provisions for future adjustment of camber, caster or toe. Therefore, on these vehicles, removal of the entire wheel assembly is necessary and/or desirable in order to align the wheel in accordance with the manufacturer's specifications. It is generally preferable to align the rear wheels first, then align the front wheels.

After the existing camber, caster, and toe readings are determined by a conventional alignment machine, the vehicle is raised on a jack or other suitable lift system wherein the alignment sensor, the rear wheel, and, in some cases, the brake drum and/or rotor are removed to allow the worker to remove the bolts securing the spindle/hub assembly to the axle. In most cases, a modifying implement, such as tapered shims, must be installed between the axle and spindle/hub assembly to correct camber and/or toe misalignment. After installation of the tapered shims (o other modifying accessories such as a tapered wedge or an eccentric bushing), the worker must reinstall the brake drum, wheel, and alignment sensors and then lower the vehicle in order to obtain new readings from the alignment machine. If the camber, caster, and/or toe settings require further adjustment, the entire procedure must be repeated until proper alignment is accomplished. Frequently, the procedure must be repeated several times before proper alignment is attained, at a time cost of approximately 20 minutes per attempt. This typical trial and error technique is extremely time consuming, monopolizes the alignment bay working area for an inordinate amount of time, and diminishes the profit margin of the business.

There are several types of conventional devices currently being marketed which are designed to assist in the wheel alignment procedure. One such device is the "knuckle leg" alignment device. This device comprises a fixture which is attached to the wheel hub after removal of the wheel from the vehicle. The "knuckle leg" is essentially a metal bracket used to support the vehicle weight once the wheel is removed, and embodies no alignment capabilities in and of itself. After an alignment sensor is attached to the "knuckle leg" device, alignment may be accomplished with the wheels removed, but only if the wheel hub itself does not have to be removed. To properly utilize this device, time and careful consideration must be given to remove both wheels of the same axle to assure that the vehicle maintains a level posture. Since the "knuckle leg" bolts to the wheel hub and supports the vehicle weight in the same manner as the vehicle wheel the device is neither time efficient nor particularly advantageous in applications which require wheel hub removal.

Another known device for assisting with wheel alignment is the magnetic adjustable camber gauge (part No. 813) manufactured by Specialty Products Company. This device, however, is designed to check only the camber reading and is unable to obtain toe and caster readings. Additionally, the magnetic mount utilized with the device covers only a one inch radius of a hub that is normally six to eight inches in diameter. This limited range of contact makes the gauge generally insufficient to ascertain reliable readings.

No known existing alignment apparatus achieves or fulfills the purposes of the present invention, namely, to accurately duplicate the camber, caster and toe readings received from an alignment machine and then obtain and monitor any changes which occur during the alignment process, eve though the vehicle is suspended with the wheels removed.

SUMMARY OF THE INVENTION

The principal object of the present invention is to provide an efficient, positive method of obtaining caster, camber and toe readings during the wheel alignment process, particularly on those vehicles where wheel removal is either required o desired for alignment purposes. This object is most frequently fulfilled when the present invention is used during rear wheel alignment on front wheel drive vehicles.

Another object of the present invention is to provide an alignment method and apparatus which permits removal of the vehicle from the alignment machine after the initial readings are ascertained, whereby freeing the alignment machine for additional work.

A further object of this invention is to provide a compact device of relatively inexpensive construction which can be easily understood and effectively operated by a trained mechanic as well as the professional alignment technician, thereby providing a more cost effective product for the business owner.

In accordance with the teachings of the present invention, there is disclosed herein a preferred embodiment of an alignment method and apparatus wherein two or three separate indicators are removably secured to the wheel hub after the initial readings for camber, caster and toe have been determined in a conventional manner. The first indicator works in conjunction with a separate gauge to accurately duplicate the initial toe reading, while the second indicator is employed to duplicate the camber reading.

The third indicator is employed in the alignment of front wheels, where the caster reading must also be duplicated. In the preferred embodiment disclosed herein, the first indicator comprises a source for light amplification by stimulated emission of radiation (i.e., a laser beam), directed at a gauge having graduated alignment marks or other indicia disposed thereon. The second indicator is preferably a bubble-type level which may be adjusted to accurately duplicate the initial camber reading, and secured in position by suitable locking means. Both indicators are mounted within a cylindrical housing having a disc shaped plate at one end, the plate being adapted for engagement with a typical wheel hub assembly. It is preferred that the plate include magnets and slots for both magnetic and mechanical engagement with the hub assembly. The third indicator is also a bubble-type level rotatably secured to the outer end of the housing for duplicating the caster reading.

By accurately duplicating the initial readings for camber, caster and toe, the present invention enables the mechanic to properly align the wheels at a location remote from the alignment machine, thereby enabling others to utilize the alignment machine in a more efficient and profitable manner. The unique method and apparatus disclosed herein are especially beneficial in this regard when used to align the rear wheels on a front wheel drive car. These and other objects of the present invention will become apparent from the reading of the following specification, taken in conjunction with the enclosed drawing.

BRIEF DESCRIPTION OF THE DRAWINGS

FIG. 11 is a top plan view of an alternative embodiment of the present invention.

DETAILED DESCRIPTION OF THE PREFERRED EMBODIMENT

Figure 1:
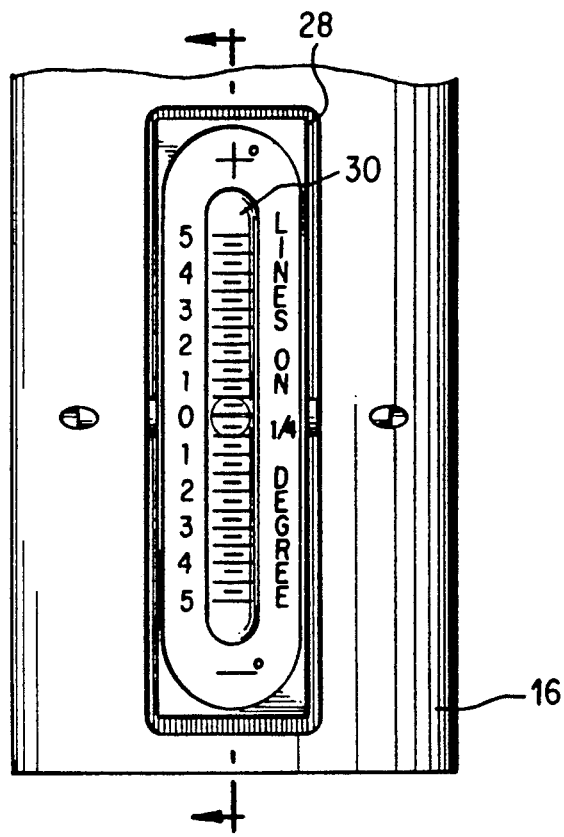
FIG. 1 is a top plan view of the bubble level indicator incorporated in the present invention.
Figure 2:
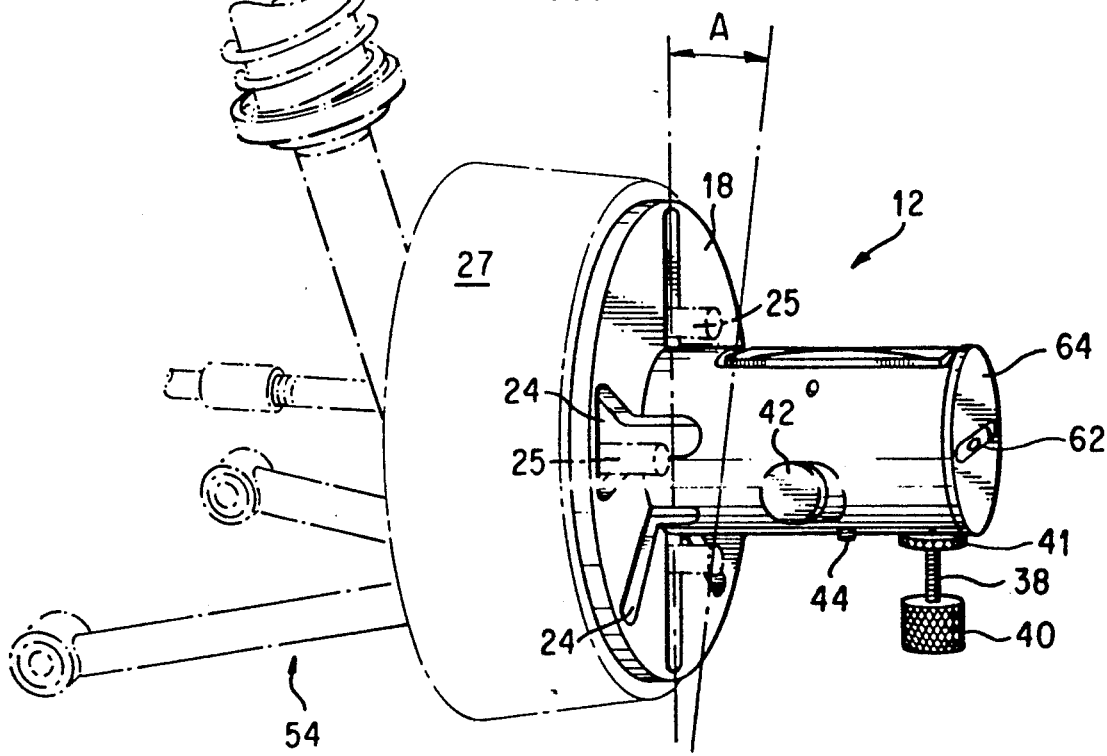
FIG. 2 is a rear perspective view of the main body portion of the present invention as installed on a wheel hub.
Figure 3:
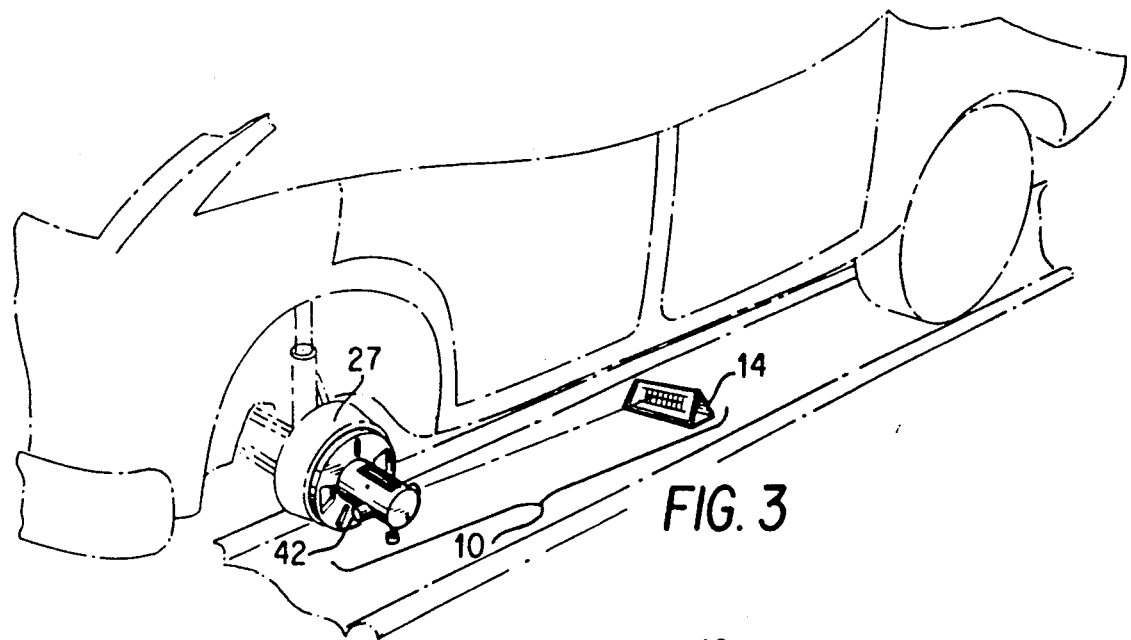
FIG. 3 is a side perspective view of the present invention as used to indicate the camber reading for an automobile wheel.
Figure 4:
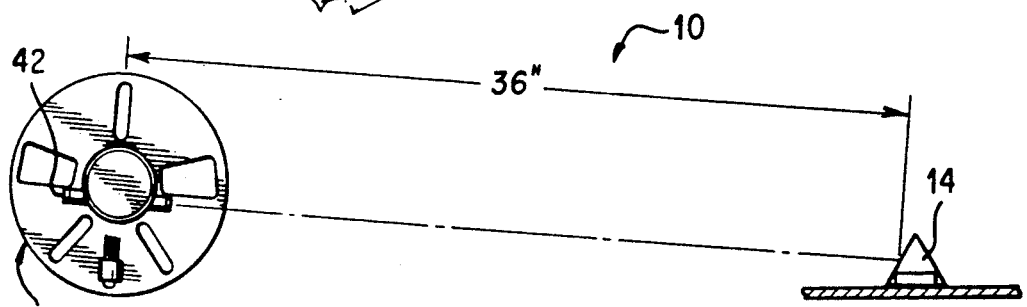
FIG. 4 is a side elevational view of the present invention.
Figure 6:
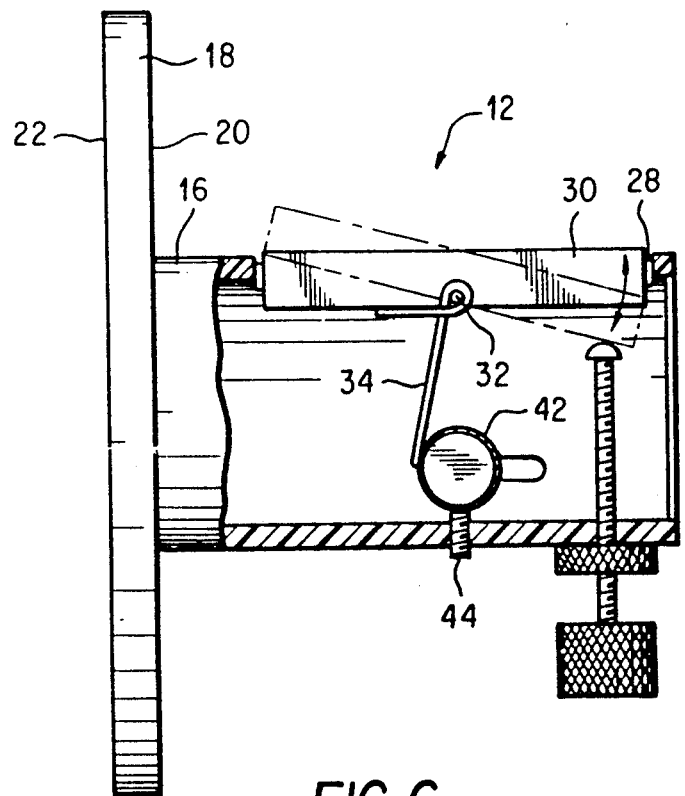
FIG. 6 is a side elevational, partially cross sectional view of the body portion of the present invention.
Figure 10:
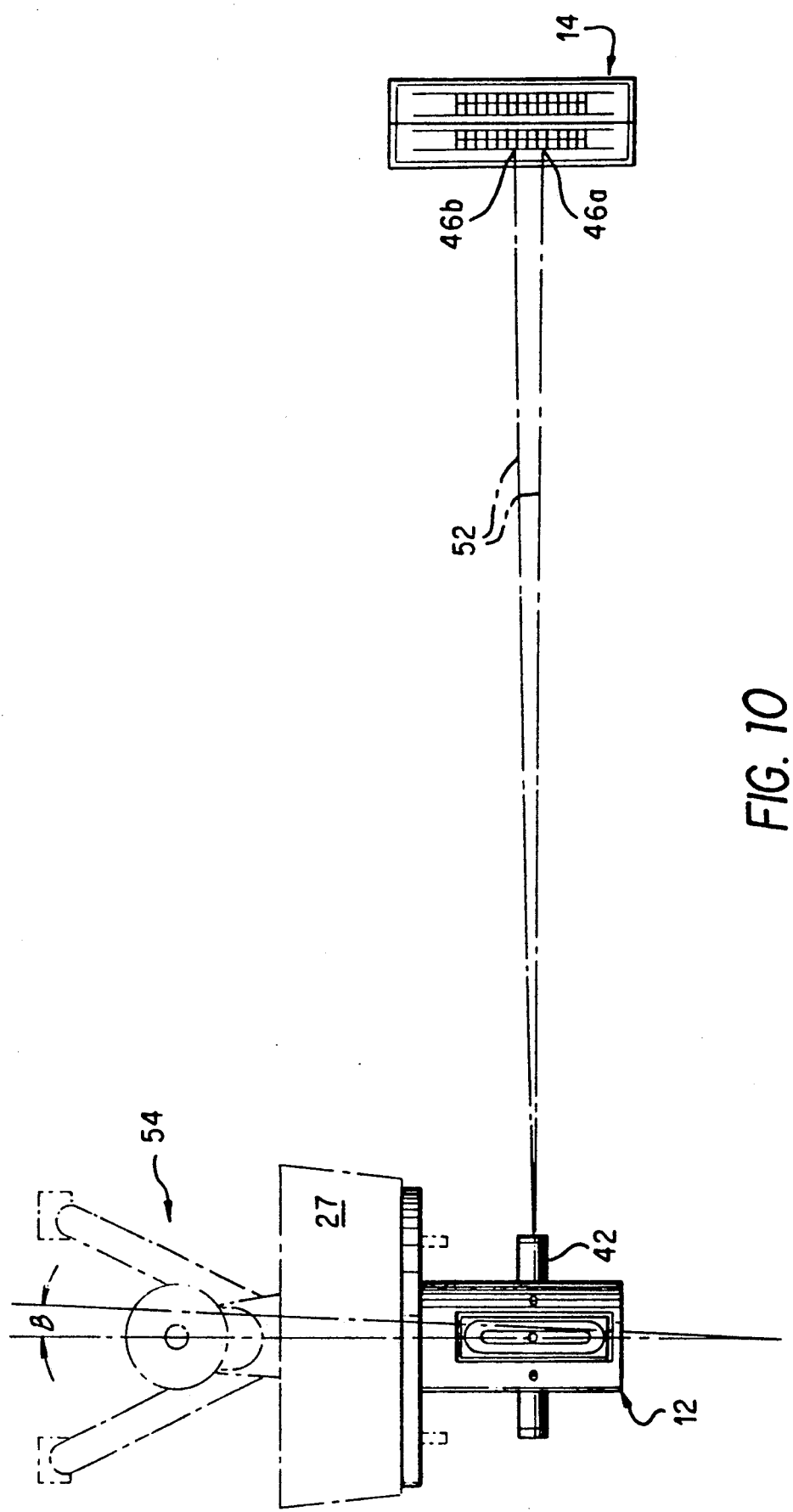
FIG. 10 is a top plan view of the present invention.

Referring initially to FIGS. 3, 4, and 10, it is seen that the wheel alignment apparatus of the present invention, designated generally by the numeral 10, comprises body portion 12 and gauge portion 14. As best shown in FIGS. 2 and 6, body portion 12 comprises a generally cylindrical shaped housing 16, secured to a disc shaped mounting plate 18. Housing 16 extends axially from the outer surface 20 of mounting plate 18, with inner surface 22 facing in the opposite direction.

In the preferred embodiment for alignment apparatus 10, housing 16 and mounting plate 18 are constructed from a strong, lightweight material, such as polyvinylchloride plastic (PVC), a lightweight metal such as aluminum, or any other material suitable for the purpose. When constructed from PVC, it is preferred that housing 16 be permanently attached to mounting plate 18 by means of a suitable adhesive. It will be clear to those skilled in the art, however, that any number of materials may be suitable for the purposes disclosed herein.

Mounting plate 18 includes a plurality of slots 24 formed therein, which are suitable for securing body portion 12 to studs 25 projecting from conventional hub assembly 27 as shown in FIG. 2. Additionally, mounting plate 18 includes magnets 26 embedded therein, so that body portion 12 may be quickly secured the hub assembly 27 without the need for additional fastening means such as lug nuts. It is preferred that magnets 26 be permanently glued within recesses formed in inner surface 22 of mounting plate 18 utilizing a suitable adhesive, but many alternative means of attachment may be utilized. It is expected that those skilled in the art will utilize either magnets 26 or slots 24, or the combination of both, to secure body portion 12 to hub assembly 27 during the tire alignment process.

Those skilled in the art will fully realize that the configuration of hub assembly 27 will vary considerably from on vehicle to another. Accordingly, the detailed construction of hub assembly 27 is omitted from this specification. The embodiment of hub assembly 27 illustrated and discussed herein is intended to depict a generic hub, which may or may not include the brake drum and/or rotor depending on the type of vehicle. The operation of the present alignment method and apparatus is essentially unaffected by variations in the design of hub assembly 27, the principles of this invention being applicable to virtually any known design. To the extent that any modifications in this invention are necessary to accommodate various hub configurations, such modifications will be readily apparent to one knowledgeable in the art.

Figure 7:
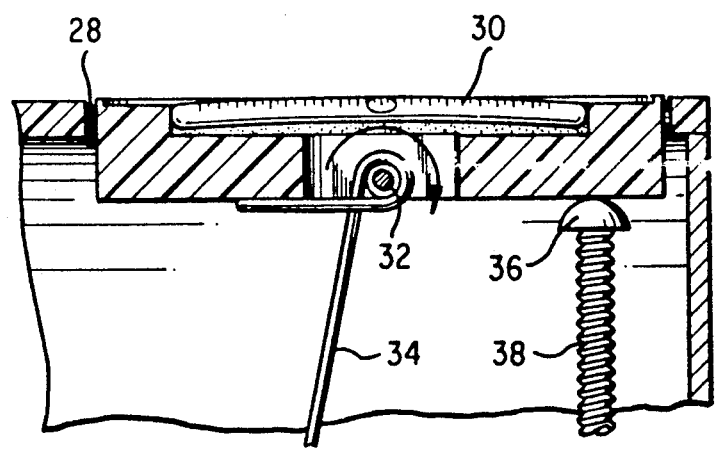
FIG. 7 is a partial cross sectional view of the body portion of the present invention, taken along line 7—7 of FIG. 1.
Figure 5:
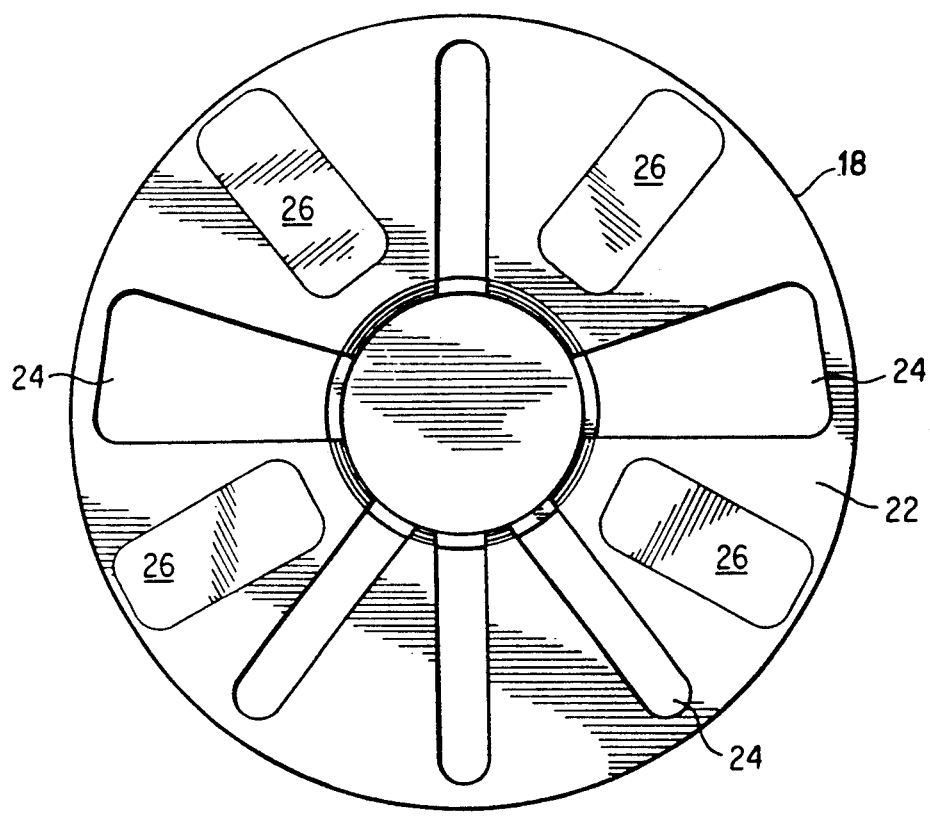
FIG. 5 is a side elevational view of the body mounting plate of the present invention.

A generally rectangular-shaped opening 28 is formed in the top portion of housing 16, with bubble level 30 pivotably mounted therein. As best shown in FIGS. 6 and 7, level 30 is pivotable about pin 32, but is maintained in a selected position by torsion spring 34 and bearing end 36 of adjustment screw 38. By rotating knob 40 secured to the opposite end of adjustment screw 38, the vertical inclination of level 30 relative to the longitudinal axis of body portion 12 may be adjusted as desired, as shown in FIG. 6. Once the desired inclination of level 30 has been obtained, lock nut 41 is tightened against housing 16 to prevent inadvertent rotation of knob 40 during the alignment procedure. Level 30 serves as an indicator for duplicating the predetermined camber reading for the wheel being aligned, and in indicating the proper camber reading when obtained, as discussed more fully below.

Also disposed within housing 16 is toe indicator 42, which is rigidly secured within a transverse hole formed in housing 16 by means of set screw 44, as shown in FIG. 6. In the preferred embodiment illustrated, indictor 42 comprises an intense light source, such as a suitable light emitting diode (LED) or other source of light amplification by stimulated emission of radiation (laser). It is preferred that indicator 42 include a convenient on/off switch (not shown), and be battery powered to eliminate the necessity for an extraneous electrical power supply. Indicator 42 works in conjunction with gauge portion 14 to duplicate and correct the toe reading for the wheel being aligned, as discussed below.

When apparatus 10 is utilized for the alignment of front wheels, a caster indicator should also be incorporated. Preferably, the caster indicator comprises a bubble-type level secured to a cap or ring fitted over the outer end of housing 16, capable of rotating about the longitudinal axis of housing 16. It will be understood by those skilled in the art that an electronic protractor or other angle sensing device may be substituted for the bubble-type levels disclosed herein without departing from the scope of this invention.

Figure 8:
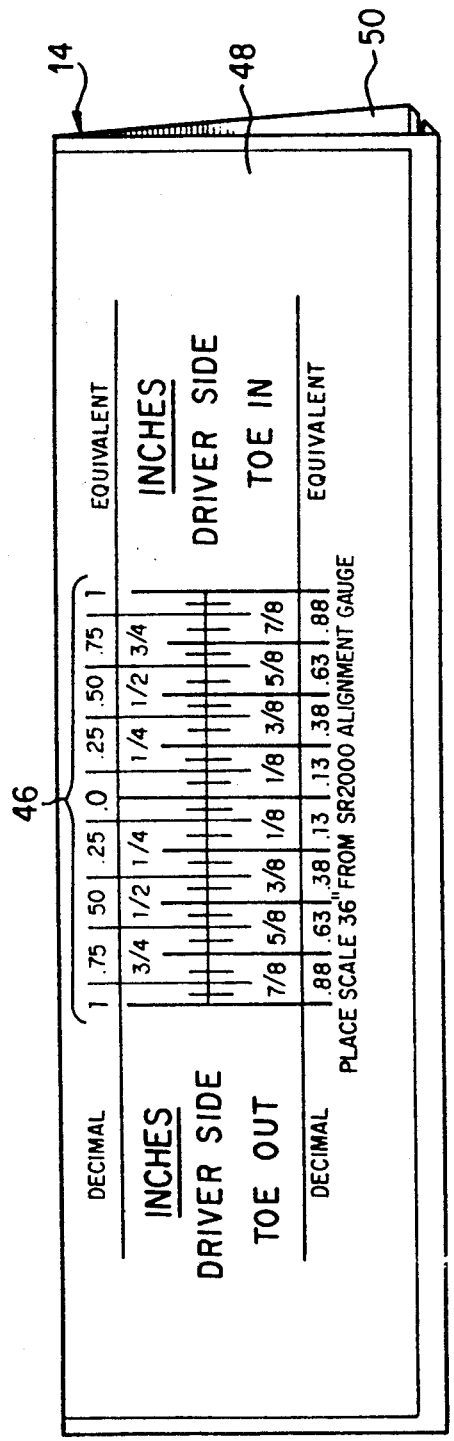
FIG. 8 is a perspective view of the gauge portion of the present invention, with toe readings indicated in inches.
Figure 9:
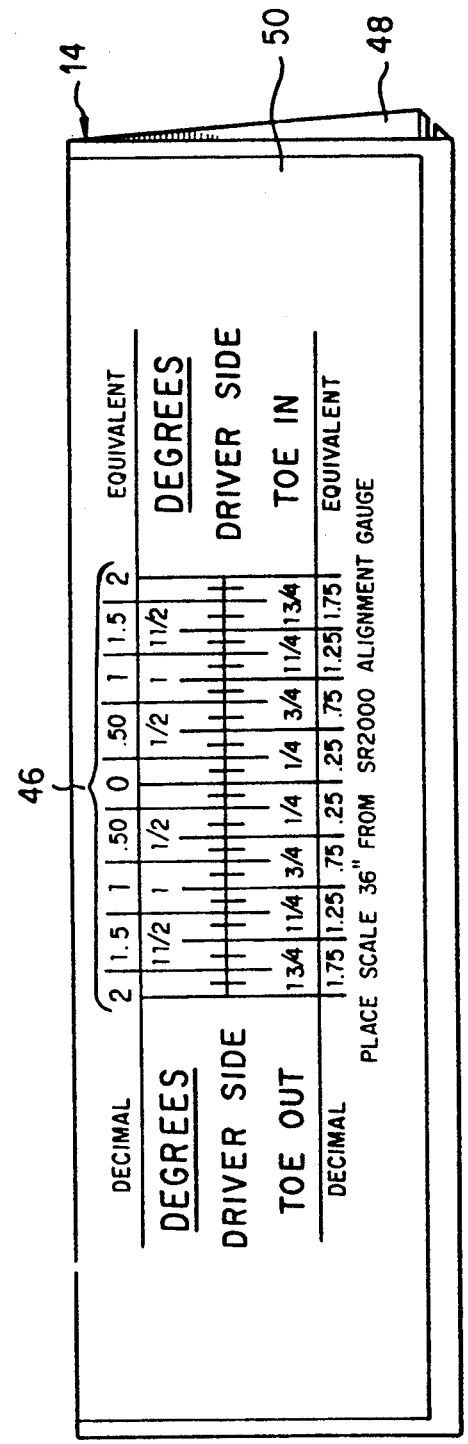
FIG. 9 is a side perspective view of the gauge portion of the present invention with toe readings indicated in degrees.

Referring now to FIGS. 8 and 9, gauge 14 is seen to comprise a single piece of lightweight metal or other suitable material, formed to create a measuring device having a generally triangular cross sectional configuration. Toe alignment indicia 46 are inscribed or otherwise disposed on upright standing walls 48 and 50 of gauge 14. It is preferred that one side of gauge 14 provide alignment indicia 46 in units of inches, as on wall 48 in FIG. 8, as well as in units of degrees as on wall 50 in FIG. 9. It is also contemplated that alignment apparatus 10 may include two gauges, one for the automobile driver's side as shown in FIGS. 8 and 9, and another for the passenger side, not shown. Those skilled in the art will appreciate the fact that the only difference between two such gauges will be the reversal of the "toe-in" and "toe-out" designations.

The unique features of the present invention provide a method for aligning an automobile wheel which has heretofore been unknown in the art. Initially, the existing camber, caster and toe readings are determined utilizing a computerized or other conventional alignment testing machine (while this description mentions caster settings, those skilled in the art will understand that caster is irrelevant for the alignment of rear wheels). Once the existing readings are known, the vehicle may be moved to another location where the alignment procedure can be carried out utilizing the present invention, thereby making the alignment machine available for the next vehicle. Once moved, the vehicle is then elevated and the wheels to be aligned are removed and body portion 12 of alignment apparatus 10 is secured to the hub, or brake drum, as appropriate.

If caster is to be adjusted, the next step of the procedure is to rotate the caster indicator until the caster level 62 indicates the initial reading. The brake is then locked for that wheel, and conventional caster adjustment means are applied till the correct setting is indicated on the caster level 62. Caster adjustment is typically accomplished by loosening and re-positioning certain suspension components, if the vehicle is so equipped, or by the addition of spacers or shims as required. Caster level 62 is preferably attached to ring 64, which is rotatably and removably secured to the distal end of housing 16.

Camber adjustment is next accomplished in a manner procedurally identical to caster adjustment as described above. First, adjustment screw 38 is rotated by means of knob 40 until level 30 indicates the initial camber reading as determined by the alignment machine, and knob 40 is secured in place by means of lock nut 41. Conventional camber adjusting means are then employed to increase or decrease angle A as required, until the recommended setting is indicated on level 30.

The final step in utilizing the present invention is to adjust the toe reading to its recommended setting. Gauge 14 is first placed a specified distance from body portion 12, as illustrated in FIG. 3. In the preferred embodiment shown, alignment indicia 46 on gauge 14 are calibrated to be accurate at a distance of approximately 36 inches from body portion 12. For most applications, misplacement of gauge 14 one or two inches in either direction will have a negligible impact on the alignment settings. For higher precision, the alternative embodiment shown in FIG. 11 incorporates a prism 56 and mirrors 58 and 60 to provide a dual beam projection, with the beams converging at a single point. With the alternative embodiment, the beam is reflected on gauge 14 as two separate dots until gauge 14 positioned at the proper distance from body portion 12, at which distance the beams converge into a single point reflected on gauge 14.

The unique method for obtaining proper toe alignment with apparatus 10 is best illustrated by FIG. 10, wherein light beam 52 is shown to illuminate points 46a and 46b on gauge 14. In the example shown, point 46a corresponds to the initial toe reading established by the alignment machine, while point 46b represents the desired setting established by the manufacturer's specifications. Correct toe alignment is affected by positioning gauge 14 so that beam 52 illuminates point 46a, with gauge 14 being a proper distance from indicator 42 as required by the calibration of gauge 14. Then, with gauge 14 maintained stationary, conventional toe adjustment means are suitably manipulated by conventional methods until beam 52 illuminates point 46b. To prevent inadvertent movement, gauge 14 is preferably provided with a magnetic base for attachment to the metal rack typically employed with lift devices. As illustrated, the movement of light beam 52 from point 46a to point 46b by use of the toe adjustment means results in the corresponding angular repositioning of hub assembly 27, represented by angle B in FIG. 10. At this point, all alignment adjustments are complete for the wheel being aligned, and the operator may proceed to the next wheel or vehicle, as appropriate.

In the above description, reference is frequently made to conventional adjustment means for camber, caster and toe. The details for such adjustment means are not disclosed herein even though they comprise a significant portion of the novel alignment method of this invention. The generic suspension components identified by numeral 54 normally comprise such adjustment means, but the illustrated components 54 do not reflect the detailed adjustment means for any particular vehicle. It will be clearly understood by those skilled in the art, however, that the references to conventional camber, caster and toe adjustment means refer to those apparatus and techniques which are typically employed for adjustment of these parameters, and that such apparatus and techniques may vary considerably from one vehicle to the next.

It will also be understood by those skilled in the art that this specification is by illustration only and that the invention is not necessarily limited to the specific embodiments disclosed herein, since alternative embodiments and operating techniques will become apparent to those skilled in the art in view of this disclosure. Accordingly, modifications are contemplated which can be made without departing from the spirit of the described invention.

I claim:

1. An apparatus for indicating predetermined and desired alignment settings of a front or rear automobile wheel hub assembly and allowing correction of such settings with the wheel removed, said hub assembly having a generally flat surface with a central hub portion and a plurality of studs extending therefrom, said apparatus comprising:

a generally tubular body, having an open end adapted for receiving said hub portion;

first indicator means disposed in said body for duplicating a predetermined camber setting of said hub assembly after attachment of said apparatus to said hub assembly, said first indicator means being further operative to indicate a desired camber setting for said wheel upon suitable adjustment thereof; and an annular plate member extending outwardly from said open end of said body, said plate member having a plurality of radial slots formed therein extending from said open end of said body, said flange further including a plurality of magnets disposed therein, wherein:

said slots and said magnets cooperate with said first open end to facilitate attachment of said apparatus to said hub assembly, said magnets being operative to secure said plate member to said generally flat surface of said hub assembly while said slots accommodate said studs and said open end receives said hub portion to allow said plate member to fit substantially flush against said generally flat surface.

2. An apparatus as set forth in claim 1, wherein:
said slots are adapted to allow at least one nut to be threaded onto at least one of said studs to further secure said plate member to said generally flat surface of said hub assembly.

3. An apparatus as set forth in claim 1, further comprising:
second indicator means for duplicating a predetermined toe setting of said wheel after attachment of said apparatus to said hub assembly, said second indicator being further operative to indicate a desired toe setting upon suitable adjustment thereof.

4. An apparatus as set forth in claim 3, wherein said second indicator means comprise:
a selectively operable light beam projection source disposed in said body; and
a gauge having toe setting indicia disposed thereon, whereby placement of said gauge in the path of said beam of light such that said beam of light illuminates the indicia corresponding to the predetermined toe setting of said hub assembly enables duplication of said predetermined toe setting.

5. An apparatus as set forth in claim 4, wherein:
said selectively operable light beam projection source comprises a laser.

6. An apparatus as set forth in claim 4, wherein:
said gauge has two discrete groups of toe setting indicia disposed thereon, a first group indicating toe setting in inches, and a second group indicating toe setting in degrees.

7. An apparatus as set forth in claim 1, wherein:
the number of said slots is six, and the number of said magnets is four.

8. An apparatus as set forth in claim 4, wherein:
said gauge includes a magnet for removably securing said gauge to a metallic surface during use to prevent inadvertent movement thereof.

9. An apparatus as set forth in claim 1, further comprising:
third indicator means for duplicating a predetermined caster setting of said wheel after attachment of said apparatus to said hub assembly, said second indicator being further operative to indicate a desired caster setting upon suitable adjustment thereof.

10. A method of aligning a wheel secured to a front or rear hub assembly of an automobile, or similar vehicle, having camber, caster, and toe adjustment means associated therewith, comprising the steps of:
determining initial setting for toe, camber, and caster utilizing any conventional apparatus;
moving the vehicle to a location remote from said conventional apparatus;
raising said wheel and removing said wheel from its respective hub assembly, thereby exposing said hub assembly, said hub assembly having a generally flat portion with a plurality of studs extending therefrom and a centrally located hub portion;
securing an apparatus to said hub assembly, said apparatus comprising
a generally tubular body, having an open end adapted for receiving said hub portion;
first indicator means disposed in said body for duplicating the initial camber setting of said hub assembly, said first indicator means being further operative to indicate a desired camber setting upon suitable adjustment of said camber adjustment means;
second indicator means for duplicating the initial toe setting of said wheel, said second indicator means being further operative to indicate a desired toe setting upon suitable adjustment of said toe adjustment means; and
an annular plate member extending outwardly from said open end of said body, said plate member having a plurality of radial slots formed therein extending from said open end of said body, said flange further including a plurality of magnets disposed therein,
said slots and said magnets cooperating with said first open end to facilitate attachment of said apparatus to said hub assembly, said magnets being operative to secure said plate member to said generally flat surface of said hub assembly while said slots accommodate said studs and said open end receives said hub portion to allow said plate member to fit substantially flush against said generally flat surface;
duplicating said initial settings for camber and toe on said first and second indicator means, respectively; and
adjusting the camber and toe settings until said first and second indicator means indicate the desired settings thereof, with said wheel removed and said hub assembly maintained in a raised position.

11. A method of aligning a wheel as set forth in claim 10, wherein said apparatus further comprises third indicator means for duplicating said initial caster setting of said wheel, said third indicator means being further operative to indicate a desired caster setting upon suitable adjustment of said caster adjustment means, said method further comprising the steps of:

adjusting the caster setting until said third indicator means indicate the desired setting thereof, with said wheel removed and said hub assembly maintained in a raised position.

* * * * *